US009001882B2

(12) United States Patent
Sachdeva et al.

(10) Patent No.: US 9,001,882 B2
(45) Date of Patent: Apr. 7, 2015

(54) SYSTEM FOR ENTROPY DECODING OF H.264 VIDEO FOR REAL TIME HDTV APPLICATIONS

(75) Inventors: Ravin Sachdeva, New Delhi (IN); Sumit Johar, New Delhi (IN); Daniele Alfonso, Magenta (IT)

(73) Assignees: STMicroelectronics International N.V. (NL); STMicroelectronics S.r.l. (IT)

( * ) Notice: Subject to any disclaimer, the term of this patent is extended or adjusted under 35 U.S.C. 154(b) by 552 days.

(21) Appl. No.: 13/165,015

(22) Filed: Jun. 21, 2011

(65) Prior Publication Data

US 2011/0310958 A1    Dec. 22, 2011

(51) Int. Cl.
*H04B 1/66* (2006.01)
*H04N 19/42* (2014.01)
*H04N 19/91* (2014.01)

(52) U.S. Cl.
CPC .............. *H04N 19/42* (2014.11); *H04N 19/91* (2014.11)

(58) Field of Classification Search
CPC ................... H04N 19/00478; H04N 19/00951
USPC .......................................... 375/240; 711/103
See application file for complete search history.

(56) References Cited

U.S. PATENT DOCUMENTS

| | | | |
|---|---|---|---|
| 5,815,600 A * | 9/1998 | Sano et al. | 382/232 |
| 6,002,718 A * | 12/1999 | Roth | 375/240 |
| 7,592,937 B1 | 9/2009 | Chang | |
| 2005/0074176 A1 * | 4/2005 | Marpe et al. | 382/239 |
| 2005/0123207 A1 * | 6/2005 | Marpe et al. | 382/239 |
| 2006/0023795 A1 * | 2/2006 | Kim | 375/242 |
| 2006/0294174 A1 * | 12/2006 | Haque et al. | 708/490 |
| 2007/0080832 A1 | 4/2007 | Yang et al. | |
| 2007/0297501 A1 * | 12/2007 | Hussain et al. | 375/240 |
| 2008/0246637 A1 | 10/2008 | Chen et al. | |
| 2010/0104022 A1 * | 4/2010 | Chatterjee et al. | 375/240.24 |
| 2010/0115181 A1 * | 5/2010 | Tillgren | 711/103 |
| 2011/0248871 A1 * | 10/2011 | Kim et al. | 341/51 |

OTHER PUBLICATIONS

Advanced Video Coding for Generic Audio-Visual Services, ITU-T Rec. H.264 and ISO/IEC 14496-10 (MPEG-4 AVC), Mar. 2010, pp. 406.
Annex G—Advanced Video Coding for Generic Audio-Visual Services, ITU-T Rec. H.264 and ISO/IEC 14496-10 (MPEG-4 AVC), Mar. 2010, pp. 212.
Annex H—Advanced Video Coding for Generic Audio-Visual Services, ITU-T Rec. H.264 and ISO/IEC 14496-10 (MPEG-4 AVC), Mar. 2010, pp. 56.

(Continued)

*Primary Examiner* — Sath V Perungavoor
*Assistant Examiner* — Peter D Le
(74) *Attorney, Agent, or Firm* — Seed IP Group PLLC

(57) ABSTRACT

An embodiment relates to a decoder for decoding CABAC encoded video data in real time for HDTV applications. The decoder comprises a binary arithmetic decoder block for converting an input bit stream into a bin string, a context memory for storing a plurality of context values, and a plurality of finite state machines. Each of the finite state machines is adapted for decoding a particular one of the H.264 syntax elements by providing the binary arithmetic decoder block with an index of the relevant context value within the context memory and by converting the resulting bin stream into a value of the current syntax element. In this manner, a performance of one bin per cycle may be achieved.

61 Claims, 7 Drawing Sheets

(56) References Cited

OTHER PUBLICATIONS

Yuan-Teng Chang, "A Novel Pipeline Architecture for H.264/AVC CABAC Decoder", IEEE Asia Pacific Conference on Circuits and Systems, 2008, pp. 308-311.

Yongseok Yi, and In-Cheol Park, "High-Speed H264/AVC Cabac Decoding", IEEE Transactions on Circuits and Systems for Video Technology, vol. 17, No. 4, Apr. 2007, pp. 490-494.

Wei Yu and Yun He, "A High Performance CABAC Decoding Architecture", IEEE Transactions on Consumer Electronics, vol. 51, No. 4, Nov. 2005, pp. 1352-1359.

Thomas Wiegand, Gary J. Sullivan, Gisle Bjontegaard, and Ajay Luthra, "Overview of the H.264 / AVC Video Coding Standard", IEEE Transactions on Circuits and Systems for Video Technology, Jul. 2003, pp. 19.

Detlev Marpe, Gunnar Marten, and Hans L. Cycon, "A Fast Renormalization Technique for H.264/MPEG4-AVC Arithmetic Coding", 51st Internationales Wissenschaftliches Kolloquium, Technische Universität Ilmenau, Sep. 11-15, 2006, pp. 14.

Chung-Hyo Kim, and In-Cheol Park, "High Speed Decoding of Context-based Adaptive Binary Arithmetic Codes Using Most Probable Symbol Prediction", ISCAS 2006, IEEE 2006, pp. 1707-1710.

José L. Núñez-Yáñez, Vassilios A. Chouliaras, "Design and Implementation of a High-Performance and Silicon Efficient Arithmetic Coding Accelerator for the H.264 Advanced Video Codec", Proceedings of the 16th International Conference on Application-Specific Systems, Architecture and Processors (ASAP'05), IEEE 2005, pp. 6.

Detlev Marpe, Heiko Schwarz, and Thomas Wiegand, "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

M. Elena Castro Carballo, Javier D. Bruguera and Roberto Rodriguez Osorio, "Optimizing CABAC for VLIW architectures", DCIS 2006, pp. 6.

Jian-Wen Chen, Cheng-Ru Chang, Youn-Long Lin, "A Hardware Accelerator for Context-Based Adaptive Binary Arithmetic Decoding in H.264/AVC" in Proc. IEEE ISCAS May 2005, vol. 5, pp. 4525-4528.

Junhao Zheng, David Wu, Don Xie, and Wen Gao, "A Novel Pipeline Design for H.264 CABAC Decoding", in Advances in Multimedia Information Processing—PCM 2007, vol. 4810/2007, pp. 559-568.

\* cited by examiner

SYSTEM FOR ENTROPY DECODING OF H.264 VIDEO FOR REAL TIME HDTV APPLICATIONS

PRIORITY CLAIM

The instant application claims priority to Italian Patent Application No. VI2010A000175, filed Jun. 21, 2010, which application is incorporated herein by reference in its entirety.

TECHNICAL FIELD

An embodiment relates to a decoder for entropy decoding of H.264 video for Real Time HDTV Applications, in particular to an optimized hardware implementation of a CABAC decoder.

BACKGROUND

Entropy coding plays a key role in Information theory. By definition, the entropy H(X) is the minimum rate by which a discrete source X with alphabet $\{x_1, x_2, \ldots, x_N\}$ can be lossless encoded. The goal of entropy coding is then to define a code C which allows the encoding of the source alphabet by approximately the rate of entropy. In principle, this is possible by using Variable Length Codes (VLC), like the famous Huffman code. One important constraint of VLC codes is the prerequisite of integer bit allocation, which means that each symbol is coded with an integer number of bits.

This constraint is overcome by Arithmetic Coding, a kind of entropy coding which assigns a code to a whole message, rather than to source symbols, so that each symbol of the message is actually encoded with a fractional number of bits, thus achieving a final rate which is closer to the entropy.

Context-Based Adaptive Binary Arithmetic Coding (CABAC) is one of the two entropy coding methods of the ITU-T/ISO/IEC standard for video coding, H.264/AVC (cf. ITU-T and ISO/IEC JTC 1, "Advanced Video Coding for Generic Audio-Visual Services", ITU-T Rec. H.264 and ISO/IEC 14496-10 (MPEG-4 AVC), Version 11, March 2009, which is incorporated by reference). The CABAC method utilizes a context sensitive, backward-adaptation mechanism for calculating the probabilities of the input symbols. The context modeling is applied to a binary sequence of the syntactical elements of the video data such as block types, motion vectors, and quantized coefficients binarized using predefined mechanisms. Each bit is then coded with either adaptive or fixed probability models. Context values are used for appropriately adapting the probability models.

FIG. 1 is a block diagram of a conventional H.264 decoder and shows the arrangement of the CABAC decoder within the H.264 decoder.

The input bit stream is received by the entropy decoder 110 in order to decode header information, motion vectors, and transform coefficients. The transform coefficients are reordered (block 120), and subjected to inverse quantization and inverse transform processing in blocks 130 and 135. The result is the prediction error signal, to which either one of the inter-prediction signal or the intra-prediction signal is added by means of the adder 140. The inter-prediction signal is obtained by the motion compensation block 150 on the basis of the motion vector information and the reference frames stored in block 160. The intra-prediction signal is computed by intra-prediction block 170. The output signal of the adder 140 is then fed through the deblocking filter 180 in order to obtain the reconstructed frame 190.

FIG. 2 is a detailed block diagram of the CABAC decoder, which is part of the entropy decoder 110 in FIG. 1 and performs the following three processes, namely context modeling, binary arithmetic decoding, and debinarization.

Context modeling is performed by the context modeler block 220, which defines which syntax element is to be decoded now and finds the index of the context to be used for current bin decoding, based on neighboring information and other parameters.

Binary arithmetic decoding is performed by the regular decoding engine 230, which receives the input bits, for instance by means of direct memory access (DMA), and processes them in three sub-stages to produce an output bin string, i.e., a sequence of binary digits. The three sub-stages are (i) buffer align & context lookup, (ii) decoding and renormalization, and (iii) next state and context update. Bins that are encoded without usage of an explicitly assigned model are decoded by the bypass decoding engine 240. The selection between the two decoding engines is performed by switching unit 210.

Debinarization, i.e., the inverse binarization stage, is performed by the debinarizer block 260, which converts bin strings to non binary valued syntax elements. Binary valued syntax elements are bypassed by means of switching unit 250.

CABAC provides an unconditional compression of approx. 19% irrespective of the input stream. However, the complexity of the encoding process of CABAC is far higher than the table driven entropy encoding schemes such as the Huffman coding. CABAC is also bit serial and its multi-bit parallelization is extremely difficult. Consequently, CABAC occupies a large chunk of total time required for H.264 Decoding.

Most decoding processes, except for CABAC, may be parallelized/pipelined. Hence, CABAC becomes a bottleneck issue when HDTV H.264 decoding is used on embedded systems.

Most implementations of CABAC decoding are done partly in hardware and partly in firmware, which is insufficient for real time decoding of HDTV video on embedded systems. Therefore, there is a need for a dedicated and independent co-processor which, when sent an initiation signal, outputs a CABAC decoded macroblock (hence taking the load off the host) into a dedicated FIFO from where the macroblock data may be picked up by the host or video decoder for pixel decoding until the end of a picture/slice is reached.

A hardware implementation of the CABAC decoding process is, for instance, known from the article by Chang Yuan-Teng ("A Novel Pipeline Architecture for H.264/AVC CABAC Decoder", IEEE Asia Pacific Conference on Circuits and Systems, 2008, which is incorporated by reference) or the article by Y. Yi and I.-C. Park ("High-Speed H.264/AVC CABAC Decoding," IEEE Transactions on Circuits and Systems for Video Technology, vol. 17, no. 4, pp. 490-494, 2007, which is incorporated by reference). These conventional approaches are based on the pipelinability of the CABAC decoding process into three pipeline stages. This has the drawback of requiring a backward path in the pipeline stages due to the updating of the context memory, often leading to unnecessary stalls. Though the authors achieve real-time performance, this performance is strictly limited to the input video stream. An input having many continuous accesses to a single context memory location would probably suffer from multiple stalls, leading to a drop in performance.

A hardware accelerator for CABAC decoding is also known from an article by Jian-Wen Chen, Cheng-Ru Chang, and Youn-Long Lin, "A Hardware Accelerator for Context- Based Adaptive Binary Arithmetic Decoding in H.264/AVC" in Proc. IEEE ISCAS, May 2005, vol. 5, pp. 4525-4528, which is incorporated by reference, and wherein decoding is controlled by an optimized finite state machine. This accelerator, however, is only capable of processing a maximum video resolution of 352×288 in real-time and, therefore, may be unsuitable for HDTV applications. Moreover, the Binary Arithmetic Decoder (BAD), the block responsible for reading the compressed bitstream and managing the arithmetic decoding and renormalization processes, is part of the syntax element decoding block, which is not the most efficient implementation of the BAD block. Finally, the conventional accelerator uses two separate memories for storing IDCT coefficients in a ping-pong fashion, hence inferring the use of pipelining in the design which has its added costs. Also, by providing direct host access to its coefficient memories, the conventional CABAC accelerator needs to handle high volume and frequent inter-block communication.

A pipeline-based architecture for CABAC decoding is also known from an article by Junhao Zheng, David Wu, Don Xie and Wen Gao, "A Novel Pipeline Design for H.264 CABAC Decoding" in Advances in Multimedia Information Processing—PCM 2007, vol. 4810/2007, pp. 559-568, which is incorporated by reference, and wherein an efficient finite state machine is developed to match the requirement of the pipeline controlling and the critical path is optimized for the timing. This approach, however, is capable of decoding the coefficient information only. Extending this approach to a decoding of all syntax elements while maintaining the required 1 bin/cycle processing is not possible for certain technical reasons.

First of all, the approach of Zheng et al. uses a "Context Register Bank" to store the contexts pertaining to coefficient decoding, and this register bank is present inside the IP and uses some kind of prefetching of contexts from the main context memory, which lies outside the IP. Coefficient contexts are just a fraction of the total number of contexts supported by the H.264 standard, and hence the register bank is much smaller in area than the main context memory. In order to decode all CABAC syntax elements, the cycles needed have to be taken into account, i.e., firstly, to fetch a chunk of required contexts from the main memory to the context register bank and, secondly, the cycles needed to write the updated contexts back into the main memory. Hence, there is a context switch every time. Taking this cycle latency due to context switching into account, maintaining a 1 bin/cycle is not possible, even with pipelining.

Secondly, the approach of Zheng et al. does not take the positioning of the neighbor macroblock memory and the state tables into account, which represents another significant factor affecting the throughput of the design. In fact, all the syntax elements except coefficient data require neighboring macroblock data for decoding. Hence, the affect of accessing Neighbor Memory has not been accounted for by Zhen et al.

SUMMARY

An embodiment of a decoder is operable to decode the macroblock header and data required during pixel decoding at a rate of at least one bin per clock cycle.

An embodiment controls a binary arithmetic decoder block by means of a plurality of Finite State Machines (FSMs), each of which is adapted for decoding a particular one of the syntax elements defined in the standard. In this manner, an efficient division of the debinarization process and an optimal clubbing of the decoding of syntax elements to form macroblock data may be achieved.

According to an embodiment, a decoder for decoding a bit stream with a plurality of CABAC encoded syntax elements is provided. The decoder comprises a context memory for storing a plurality of context values, a binary arithmetic decoder block for converting bits of a current syntax element into a bin string on the basis of the stored context values, and a plurality of finite state machines, each of the finite state machines being adapted for decoding a distinct syntax element of a plurality of predefined syntax elements, for providing the binary arithmetic decoder block with a context index indicating a context value of the plurality of stored context values required for decoding a current bin of the current syntax element, and for converting the bin string into a value of the current syntax element.

An embodiment of the binary arithmetic decoder block is adapted for looking up the context value indicated by the context index within the context memory, for decoding the current bin of the certain syntax element in accordance with said context value, and for renormalizing and updating said context value. In this manner, a performance of one bin per cycle may be achieved, thus reducing cost and complexity of the entire design.

Further, in an embodiment, the plurality of finite state machines is configured to run one after the other in a particular sequence. In an embodiment, said particular sequence is the sequence of syntax elements in the macroblock header as defined by the H.264 standard. In this manner, the debinarization process is efficiently divided into subtasks that may be implemented in a highly efficient manner by means of a corresponding plurality of finite state machines.

An embodiment of the decoder may also comprise a neighbor memory for storing information on neighboring macroblocks, wherein at least one of the plurality of finite state machines is adapted for selecting the context index on the basis of information stored in the neighbor memory. Hence, the content of the neighbor memory may be prefetched once every macroblock in order to reduce the number of accesses to that memory.

Further, an embodiment of the decoder may comprise a packaging block for packaging the data values of syntax elements of a current macroblock into a predefined format and for storing the same into a buffer memory. According to an embodiment, the buffer memory is an external FIFO memory. By using the intermediate macroblock FIFO to communicate with the outside world, the amount of inter-block communication is reduced or minimized, leading to an increase in overall performance.

BRIEF DESCRIPTION OF THE DRAWINGS

Features of one or more embodiments will become more apparent from the following description given in conjunction with the accompanying drawings, in which:

FIG. 3A is a table that shows the format of an intra-macroblock header according to an embodiment;

FIG. 3B is a table that shows the format of an inter-macroblock header according to an embodiment;

FIG. 3C is a table that contains a description of the header information of FIGS. 3A and 3B according to an embodiment;

DETAILED DESCRIPTION

Figures 3A, 3B, 3C:
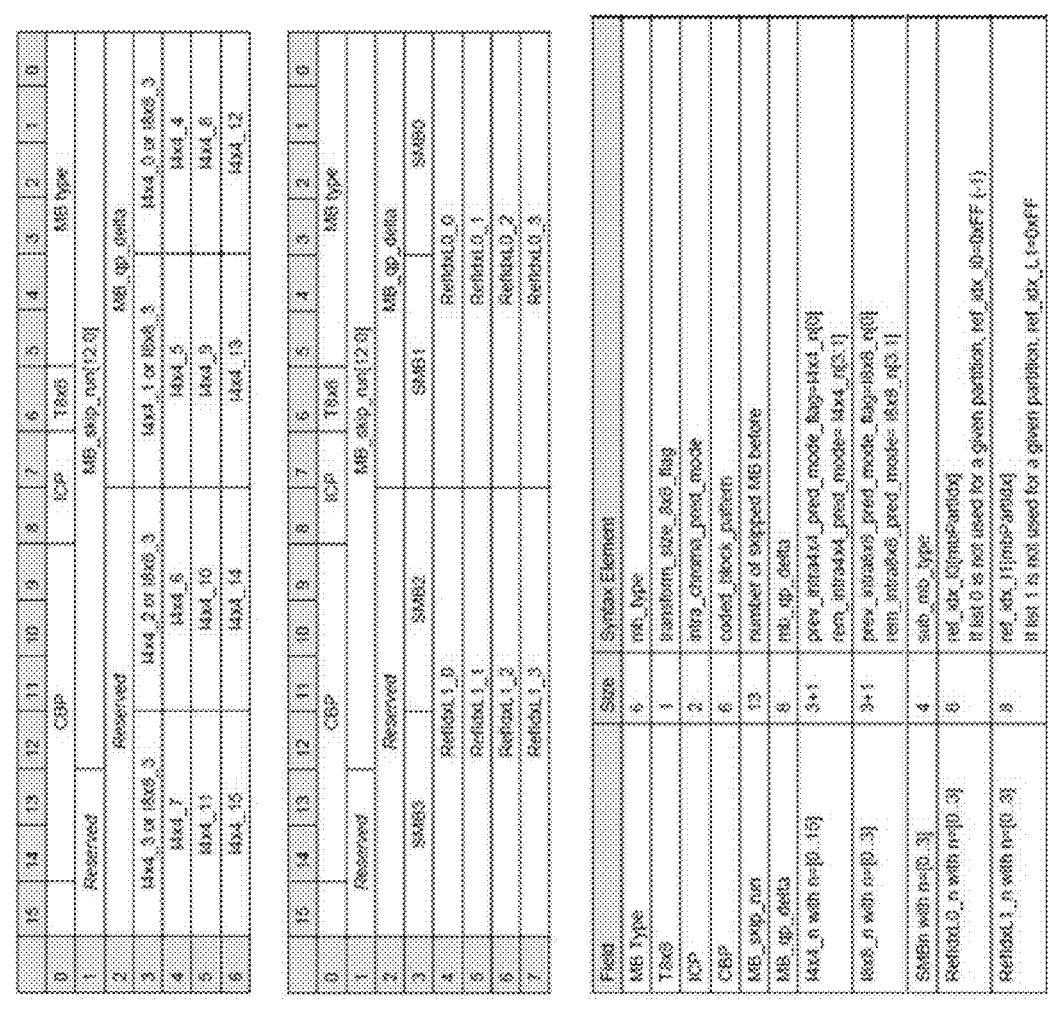

The configuration of the intra and inter-macroblock headers, as defined by the H.264 standard, is illustrated in FIGS. 3A and 3B, respectively, according to an embodiment. As it is apparent from these figures, each macroblock header is composed of several kinds of predefined syntax elements, which are described in the table shown in FIG. 3C. Each of these syntax elements may be entropy-encoded in accordance with the CABAC method. In order to decode the CABAC encoded symbols, each symbol is treated in a specific way, which is defined by the standard.

According to an embodiment, the CABAC decoder is provided with a plurality of finite state machines (FSMs), each of which being adapted for decoding a particular one of these syntax elements.

Figure 1:
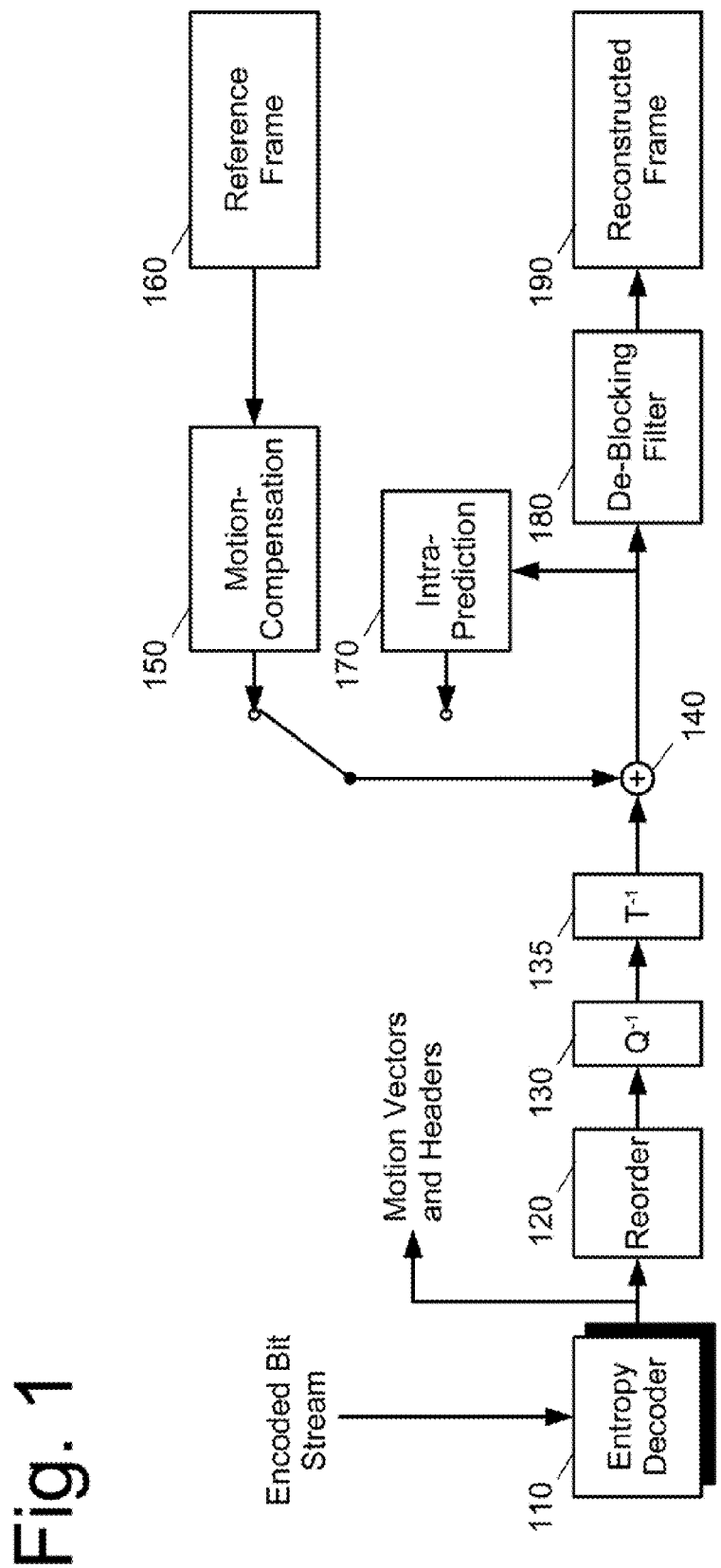
FIG. 1 a block diagram of a conventional H.264 decoder.
Figure 2:
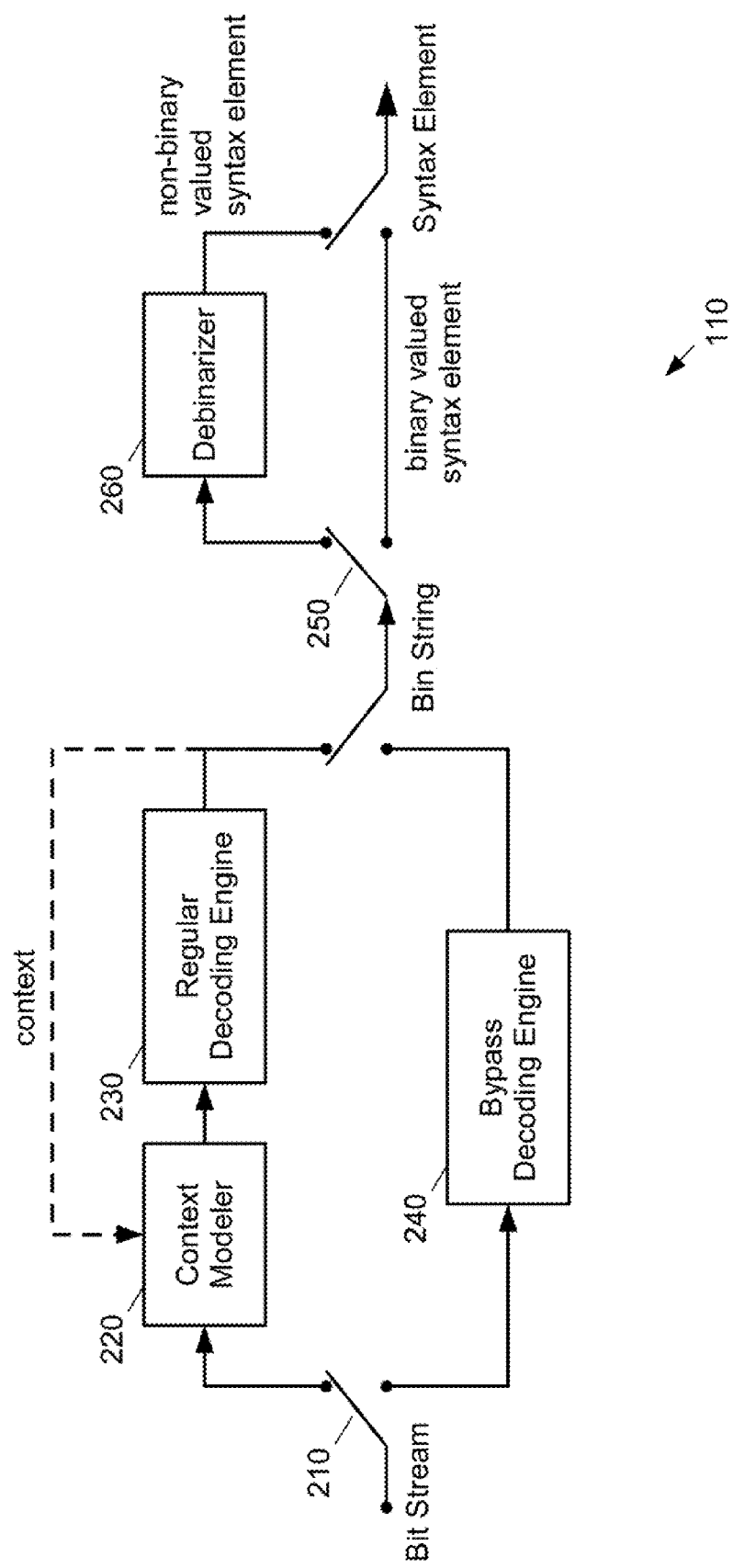
FIG. 2 is a detailed block diagram of the CABAC decoder of FIG. 1.
Figure 4:
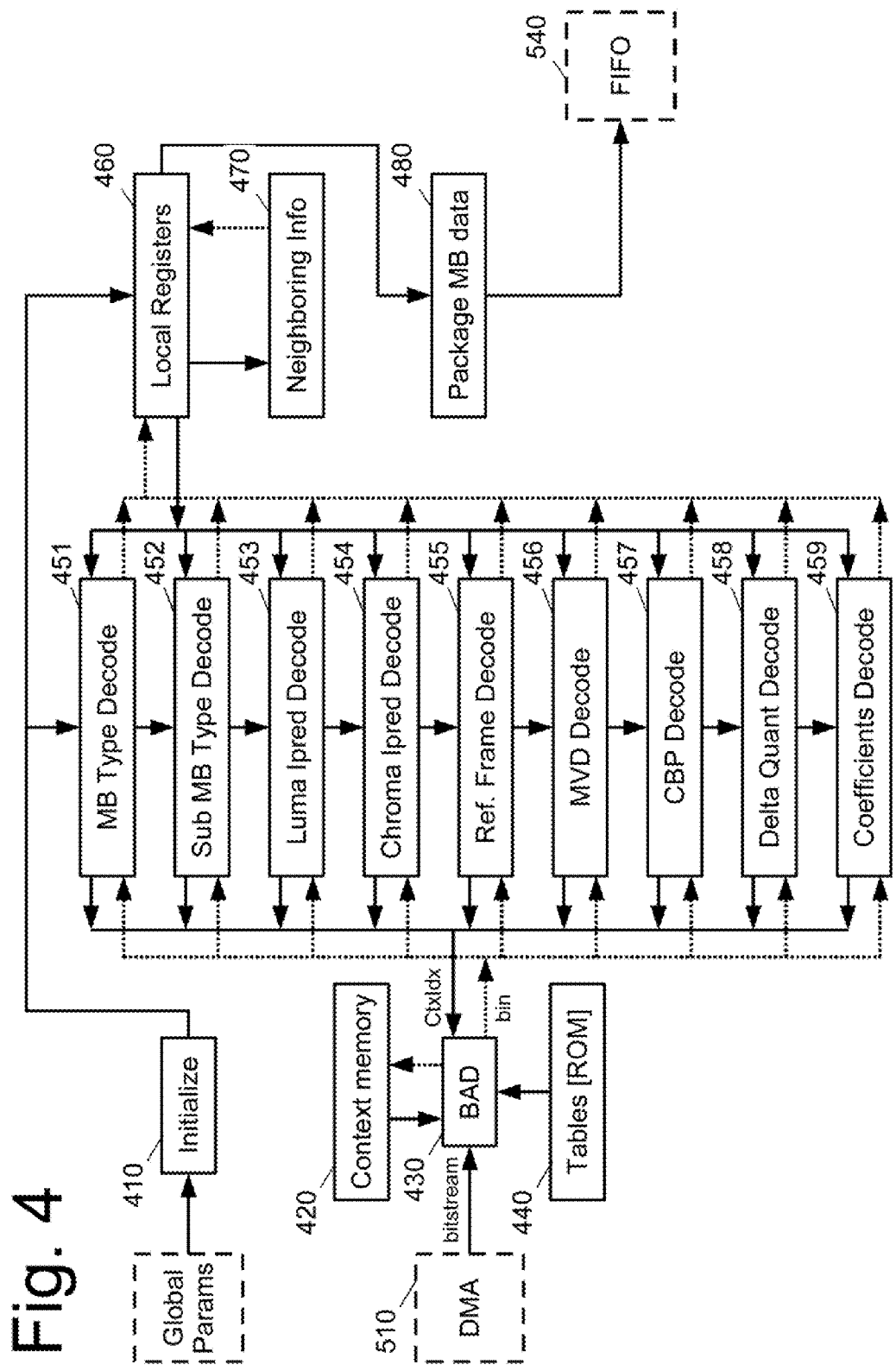
FIG. 4 is a block diagram that illustrates the architecture of the CABAC decoder according to an embodiment.

FIG. 4 is a block diagram that provides an architectural overview of the CABAC decoder in accordance with an embodiment. The core components of the CABAC decoder are the binary arithmetic decoder (BAD) block 430 and the plurality of finite state machines 451 to 459.

The BAD block 430 is the main engine of the CABAC decoder. CABAC decoding is divided into context selection, arithmetic decoding, and debinarization. The BAD block 430 directly accesses the bit stream and receives an index of the context memory location from the finite state machine that is responsible for decoding the current syntax element. To set the "state" parameters used during arithmetic decoding, the BAD block 430 also uses a fixed set of tables stored in a ROM 440. On the basis of the bits read from the bit stream and the context retrieved from the context memory 420 in accordance with the received index, the BAD block 430 produces the required bin, which is then fed to the currently active finite state machine.

The ROM block 440 comprises the rLPS Table (256 lines of 8 bits each=256 Bytes), the Next State MPS Table (64 lines of 6 bits each=48 Bytes), the Next State LPS Table (64 lines of 6 bits each=48 Bytes), as well as the fixed context tables for various syntax elements, which may be implemented physically as 17 different ROMs with a total size of approx. 5.7 Kbytes. The fixed context tables are used for initializing the context memory 420 at the beginning of every slice.

The BAD block 430 is the only block which accesses the bit stream, hence it is the only block which interacts with the direct memory access (DMA). Further, this block is the only block which accesses the context memory 420 during the arithmetic decoding process.

The BAD block 430 may need a particular context value of the context memory 420 several times in succession. Hence, the BAD block 430 is configured to avoid multiple reads from the context memory in order to improve performance. Further, the updated context is only written back to the context memory once a new location of the context memory is to be accessed.

The context memory 420 may be implemented as a SRAM memory holding a total of 720 words of 7 Bits each, i.e., 630 Bytes, in case of 720 p video. The context memory may also include the additional contexts for Scalable Video Coding (SVC) and/or Multi-view Video Coding (MVC).

The architecture for CABAC bit stream parsing has been broadly divided into the various finite state machines 451 to 459, depending upon the syntax element currently being decoded. All these finite state machines are designed to produce one bin per cycle, i.e., each of these state machines calls the BAD block 430 every cycle. Further, these state machines are configured to run one after the other in a particular sequence, namely in the sequence of the syntax elements as defined by the H.264 standard.

According to an embodiment, there are nine finite state machines 451 to 459. Each of these finite state machines is adapted for decoding a particular syntax element. Specifically, state machine 451 decodes the macroblock type for the current macroblock for different intra/inter-macroblocks. State machine 452 decodes the block type for each eight-by-eight partition of the macroblock. State machine 453 decodes the luma inter-prediction mode for the current macroblock. State machine 454 decodes the chroma inter-prediction mode for the current chromablock. State machine 455 decodes the reference frame index for the current macroblock. State machine 456 decodes the motion vector differential for the current macroblock. State machine 457 decodes the coded block pattern for the current macroblock. State machine 458 decodes the data quantization parameter for the current macroblock. Finally, state machine 459 decodes the luma/chroma, eight-by-eight/four-by-four, AC/DC coefficients for the current macroblock.

Each of these state machines 451 to 459 has access to a set of local registers 460, which are used for temporarily storing the results during the decoding of one macroblock. The local registers 460 also contain the local copies of top/left neighbor elements, as stored in the neighbor memory 470, for fast access during decoding.

The neighbor memory 470 may also be implemented as a SRAM memory capable of holding information for a maximum of one row of macroblocks plus one macroblock. In case of 720 p video, the neighbor memory holds 122 macroblocks or approximately 19 KB.

Among the information that needs to be stored in the neighbor memory for each macroblock are all possible macroblock types (Intra, Inter, and Skip: 6 bits); a flag to indicate skip mode (1 bit); the reference indices at the 8×8 block level (6*8=48 bits); the motion vector differentials for every 4×4 sub-block level (16*64=1024 bits); the sub-block type for inter-macroblocks (5*4=20 bits); the prediction direction for every 8×8 sub-block (forward/backward, interpolated: 5*4=20 bits); the 8×8 transform size flag (1 bit); the intra prediction mode for every 4×4 sub-block (4*16=64 bits); the chroma intra prediction mode (2 bits); the coded block pattern for the complete macroblock (32 bits); and the coded block pattern (32 bits).

The CABAC decoder also comprises a packaging block 480 for packaging the current macroblock data in a specified format and for pushing the packaged data into an external first-in/first-out (FIFO) buffer, from where it is picked up by the host/controller for further processing and decoding.

Initialization of the CABAC decoder is performed by initialization block 410, which is responsible for receiving the "start" signal from the host/controller, upon which it begins with the initialization of the variables and memories (including the context memory) on the basis of the global parameters provided by the host. When the initialization is completed, control is passed over to the relevant state machine to carry out bit stream parsing (CABAC decoding).

Figure 5:
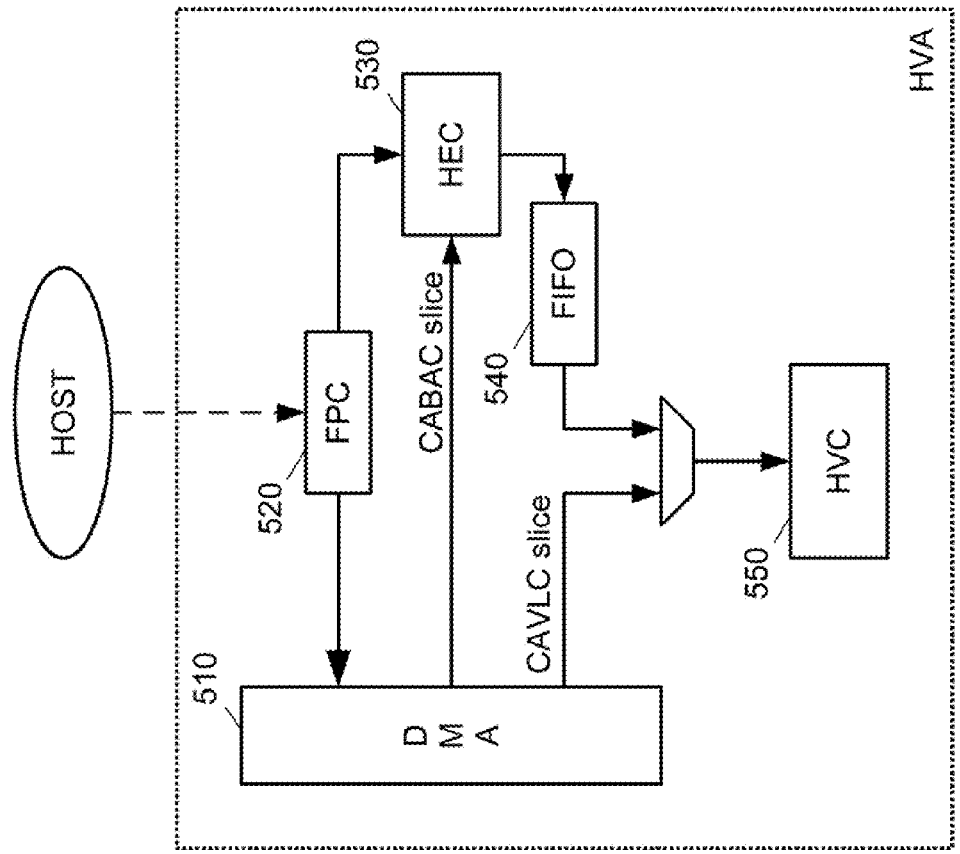
FIG. 5 is a block diagram that illustrates the integration of an embodiment of the CABAC decoder into a hardware video accelerator.

FIG. 5 is a block diagram that illustrates the integration of and embodiment of the CABAC decoder into a hardware video accelerator.

The Hardware Video Accelerator (HVA) comprises a Frame Processing Control (FPC) unit 520 that receives control commands from the host. The CABAC decoder 530 (which is also referred to as hardware entropy codec, HEC) is seen as a processor responsible for parsing the bit stream on the fly, independently on a slice basis, before texture decoding is performed by the hardware video codec (HVC) block 550. The output data of the CABAC decoder 530 is stored in a FIFO 540, which is adapted to hold a predetermined number of macroblocks and is filled with macroblock level information in a predefined format. The CABAC decoder 530 is only responsible for CABAC decoding. Cases where CAVLC is used may be handled directly by the hardware video codec block 550.

Figure 6A:
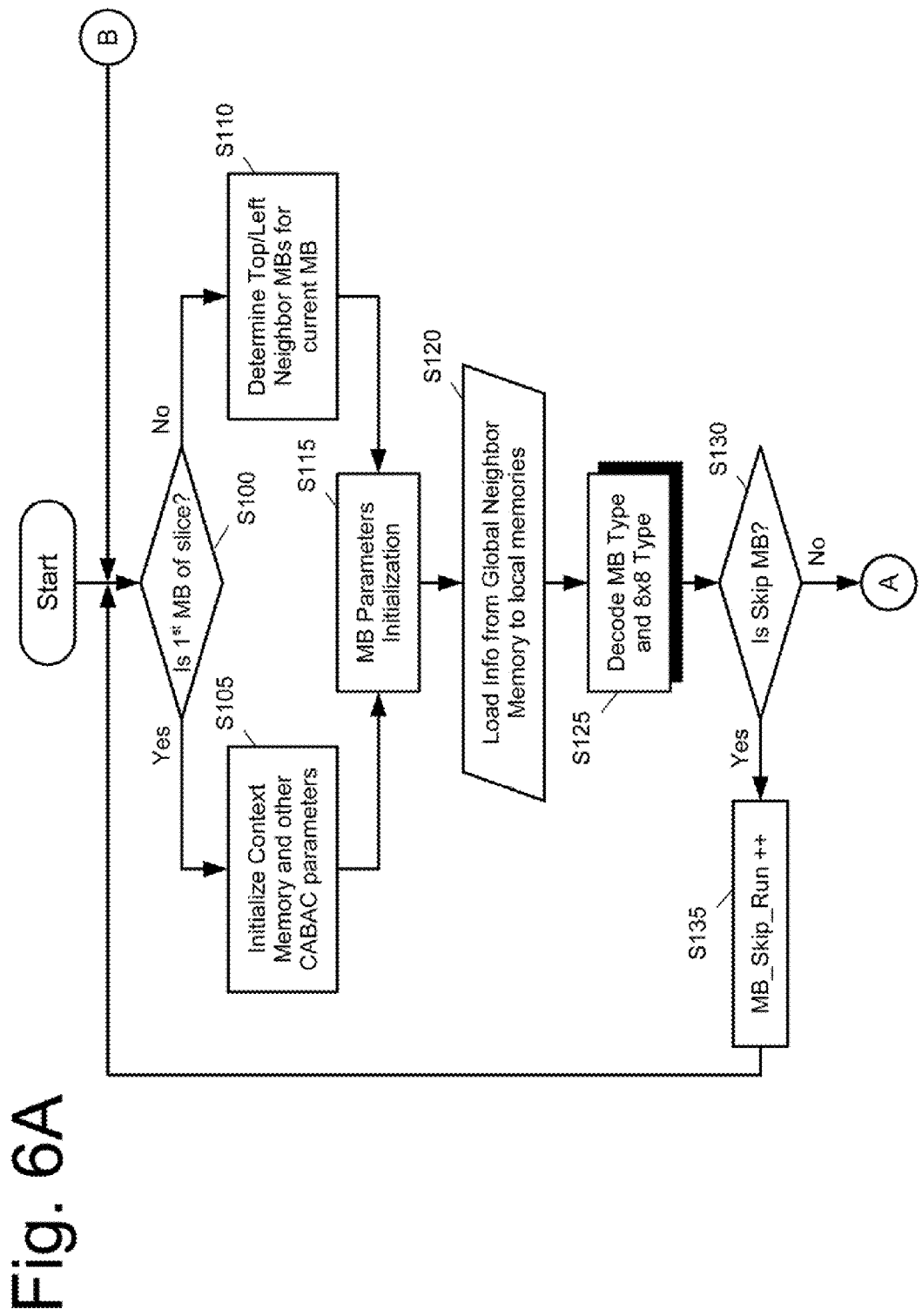
FIGS. 6A and 6B show a flowchart of the entire decoding process according to an embodiment.
Figure 6B:
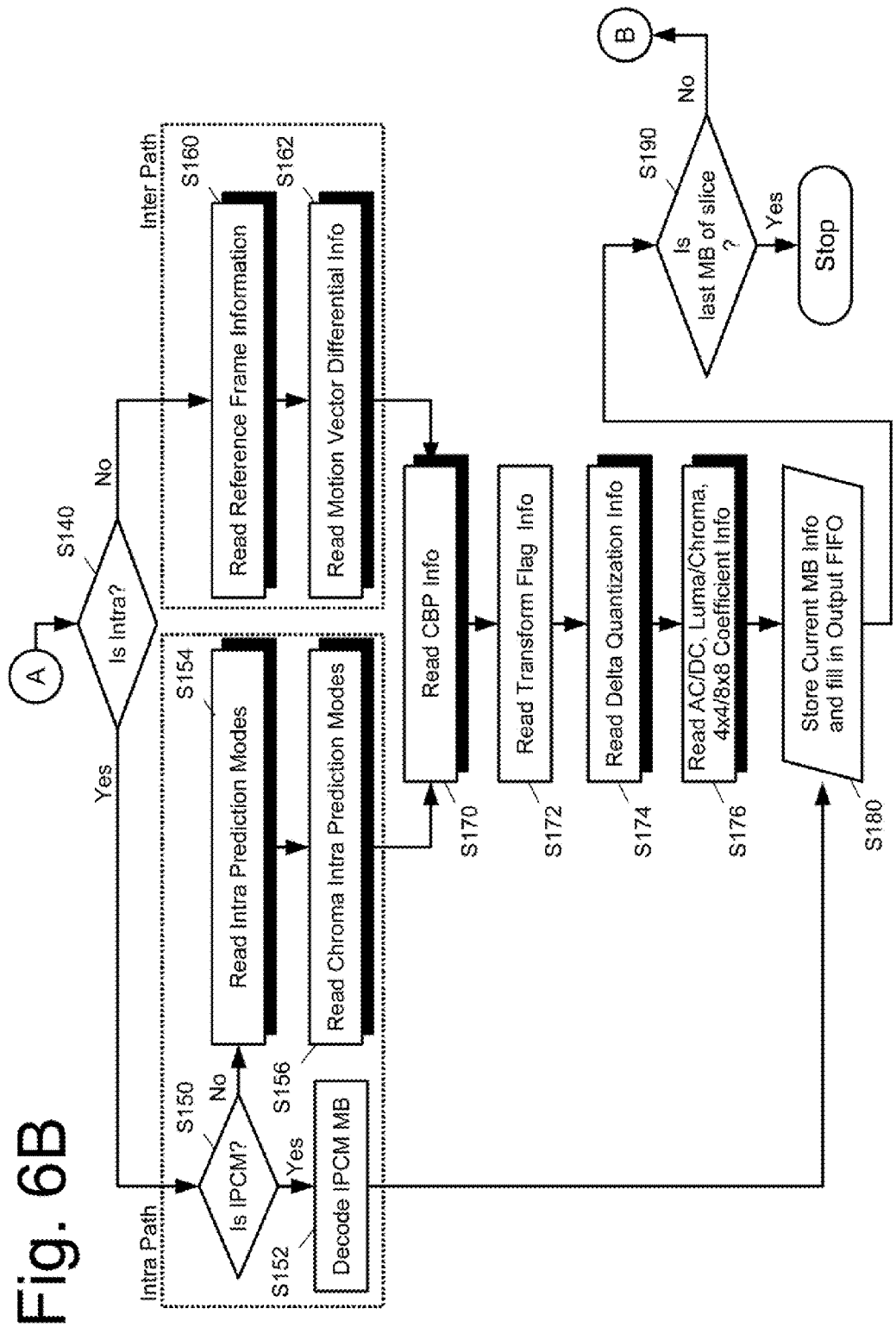

FIGS. 6a and 6b show a flowchart of the video decoding process as defined in an embodiment of the H.264 video standard. The steps performed by the finite state machines are highlighted (i.e., steps S125, S154 to S170, S174, and S176).

The system starts decoding the bit stream once it receives the "start" signal from the host or controller. In step S100 in FIG. 6A, the system determines whether the current macroblock is the first macroblock of the current slice. If this is the case, the context memory and the other CABAC parameters are initialized in step S105. If not, the top/left neighbor macroblock of the current macroblock is determined in step S110. In both cases, the processing continues with step S115, wherein the parameters of the current macroblock are initialized. Then, the information from the global neighbor memory 470 is loaded into the local memory 460 in step S120. After the macroblock type and the eight-by-eight block type is decoded in step S125, it is determined in step S130 whether the current macroblock is a "skip" macroblock or not. If this is the case, a counter is incremented in step S135 and the processing continues with step S100 for decoding the next macroblock.

If the current macroblock is not a "skip" macroblock, processing continues with step S140 in FIG. 6B, wherein it is determined whether the current macroblock is an intra-coded macroblock or an inter-coded macroblock. In the first case, it is determined in step S150, whether the current macroblock is an IPCM macroblock or not. If this is the case, the IPCM macroblock is decoded in step S152 and the processing continues at step S180. If this is not the case, the intra-prediction modes and the chroma intra-prediction modes are read in steps S154 and S156. The processing continues then with step S170. If the current macroblock is not an intra-coded macroblock ("no" in step S140), then the reference frame information and the motion vector differential information is read in steps S160 and S162. Processing continues in step S170, wherein the coded block pattern (CBP) information is read. In steps S172 to S176, the transformation flag information, the data quantization information, the AC/DC information, the luma/chroma information, and the four-by-four/eight-by-eight coefficient information is read. Finally, the current macroblock information is stored for future use as neighbor information and the output FIFO is filled in in step S180.

The above steps are repeated for all macroblocks of the current slice (cf. step S190).

The above description is focused on the CABAC entropy compression scheme, as defined by the H.264 video compression standard. However, an embodiment is not restricted to this particular standard and may also be employed with other standards, in particular with other standards of the H.264 family, such as the Scale Video Coding (SVC) standard (Annex G of ITU-T and ISO/IEC JTC 1, "Advanced Video Coding for Generic Audio-Visual Services", ITU-T Rec. H.264 and ISO/IEC 14496-10 (MPEG-4 AVC), Version 11, March 2009) and the Multi-view Video Coding (MVC) standard (Annex H of ITU-T and ISO/IEC JTC 1, "Advanced Video Coding for Generic Audio-Visual Services", ITU-T Rec. H.264 and ISO/IEC 14496-10 (MPEG-4 AVC), Version 11, March 2009), which are incorporated by reference, as an embodiment of the system may also accommodate the additional contexts and the additional debinarization logic required to decode an SVC stream or an MVC stream.

With an embodiment, the decoder is capable of handling substantially higher resolutions than most prior art decoders, namely resolutions up to the order of 1280×720 or higher in real time. This is due to the one bin per cycle processing obtained from the optimized BAD block.

Further, according to an embodiment, the number of memory accesses, in particular accesses to the neighbor memory, are minimized by optimally clubbing the decoding of the various syntax elements into a plurality of dedicated finite state machines.

Further, an embodiment of the decoder uses an intermediate macroblock FIFO to communicate with the outside world, hence reducing or minimizing the inter-block communication.

To summarize, an embodiment provides a decoder for decoding CABAC encoded video data in real time for HDTV applications. The decoder comprises a binary arithmetic decoder block for converting an input bit stream into a bin string, a context memory for storing a plurality of context values, and a plurality of finite state machines. Each of the finite state machines is adapted for decoding a particular one of the H.264 syntax elements by providing the binary arithmetic decoder block with an index of the relevant context value within the context memory and by converting the resulting bin stream into a value of the current syntax element. In this manner, a performance of one bin per cycle may be achieved.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A decoder, comprising:
   a decoder stage operable to receive coded data, to receive a context according to which the received data is coded, and to decode the data according to the context;
   a memory operable to store the context; and
   a plurality of nine state machines, each of the nine state machines operable to further decode the decoded data from the decoder stage for one respective context from among a plurality of contexts, wherein the decoder stage is further operable
   to receive a context index from one of the plurality of nine state machines; and
   to receive the context from the memory in response to the context index.

2. The decoder of claim 1 wherein the decoder stage comprises a binary arithmetic decoder.

3. The decoder of claim 1 wherein the plurality of nine state machines are finite state machines.

4. The decoder of claim 1 wherein the received coded data comprises coded video data.

5. The decoder of claim 1 wherein the received coded data comprises coded image data.

6. The decoder of claim 1 wherein the decoder stage is operable:

to receive decoding parameters; and to decode the received coded data according to the decoding parameters.

7. The decoder of claim 1, wherein the decoder stage is operable to update the context stored in the memory in response to decoding the received coded data.

8. The decoder of claim 1, further comprising:

wherein the received coded data represents a first region of an image;

wherein the memory is operable to store data that represents a second region of the image;

wherein one of the plurality of nine state machines is operable to provide to the decoder stage a context index that is related to the stored data that represents the second region of the image; and wherein the decoder stage is operable to receive the context from the memory in response to the context index.

9. The decoder of claim 1, further comprising a buffer operable to store the further decoded data from one of the plurality of nine state machines.

10. The decoder of claim 1, further comprising a first in first out buffer operable to store the further decoded data from one of the plurality of nine state machines.

11. A decoder, comprising:

a decoder stage operable to receive coded data having data types, to receive contexts according to which the received data types are respectively coded, and to decode each data type according to a respective one of the contexts;

a memory operable to store the context; and state machines each operable to further decode a respective one of the decoded data types from the decoder stage, wherein the state machines include at least nine state machines and wherein the decoder stage is further operable to receive a context index from one of the plurality of at least nine state machines; and to receive a respective one of the contexts from the memory in response to the context index.

12. The decoder of claim 11 wherein the decoder stage comprises a binary arithmetic decoder.

13. The decoder of claim 11 wherein each of the state machine comprises a respective finite state machine.

14. The decoder of claim 11 wherein each of the data types comprises a respective syntax element.

15. The decoder of claim 11 wherein the received coded data comprises coded video data.

16. The decoder of claim 11 wherein the received coded data comprises coded image data.

17. The decoder of claim 11 wherein the decoder stage is operable:

to receive decoding parameters; and to decode the received data according to the decoding parameters.

18. The decoder of claim 11, wherein the decoder stage is operable to update each of the contexts stored in the memory in response to decoding the respective received coded data types.

19. The decoder of claim 11, further comprising:

wherein the received coded data represents a first region of an image;

wherein the memory is operable to store data that represents a second region of the image;

wherein each of the state machines is operable to provide to the decoder stage a respective context index that is related to the stored data that represents the second region of the image; and wherein the decoder stage is operable to receive the contexts from the memory in response to the context indices.

20. The decoder of claim 11, further comprising a buffer operable to store the further decoded data from at least one of the state machines.

21. The decoder of claim 11, further comprising a first in first out buffer operable to store the further decoded data from at least one of the state machine.

22. The decoder of claim 11 wherein the state machines are operable to further decode the respective decoded data types from the decoder stage sequentially and in an order in which the data types are received by the decoding stage.

23. The decoder of claim 11 wherein:

the received coded data comprises a header; and the state machines are operable to further decode the respective decoded data types from the decoder stage sequentially and in an order in which the data types appear in the header.

24. The decoder of claim 11 wherein the state machines are operable to further decode the respective decoded data types from the decoder stage sequentially and in an order specified by the H.264 standard.

25. A video accelerator, comprising:

a video decoder, comprising a decoder stage operable to receive coded data, to receive a context according to which the received data is coded, and to decode the data according to the context; and a memory operable to store the context; and a plurality of nine or more state machines, each of the plurality nine or more state machines operable, for a respective context, to further decode the decoded data from the decoder stage, wherein the decoder stage is further operable to receive a context index from one of the plurality of at least nine state machines; and to receive a respective one of the contexts from the memory in response to the context index.

26. A video accelerator, comprising:

a video decoder, comprising a decoder stage operable to receive coded data having data types, to receive contexts according to which the received data types are respectively coded, and to decode each data type according to a respective one of the contexts;

a memory operable to store the context; and state machines each operable to further decode a respective one of the decoded data types from the decoder stage, wherein the state machines include nine state machines and wherein the decoder stage is further operable to receive a context index from one of the plurality of nine state machines; and to receive a respective one of the contexts from the memory in response to the context index.

27. A system, comprising:

a memory operable to store a context;

a first integrated circuit, comprising a decoder stage operable to receive coded data, to receive the context according to which the received data is coded, and to decode the data according to the context; and a plurality of state machines, each of the plurality of state machines operable for a corresponding context to further decode the decoded data from the decoder stage, wherein the plurality of state machines include nine state machines and wherein the decoder stage is further operable to receive a context index from one of the plurality of nine state machines; and to receive the context from the memory in response to the context index; and a second integrated circuit coupled to the first integrated circuit.

28. The system of claim 27 wherein the first and second integrated circuits are disposed on a same die.

29. The system of claim 27 wherein the first and second integrated circuits are disposed on respective dies.

30. The system of claim 27 wherein the first integrated circuit comprises a controller.

31. The system of claim 27 wherein the first integrated circuit comprises a video accelerator.

32. The system of claim 27 wherein the first integrated circuit comprises a video decoder.

33. The system of claim 27 wherein the first integrated circuit comprises a video encoder-decoder.

34. The system of claim 27 wherein the second integrated circuit comprises a controller.

35. The system of claim 27 wherein the second integrated circuit comprises a memory.

36. The system of claim 27, further comprising:
wherein the received coded data comprises video data; and
a display coupled to the first integrated circuit.

37. A system, comprising:
a memory operable to store a context;
a first integrated circuit, comprising
a decoder stage operable to receive coded data having data types, to receive contexts according to which the received data types are respectively coded, and to decode each data type according to a respective one of the contexts; and
state machines each operable to further decode a respective one of the decoded data types from the decoder stage, wherein the state machines include at least nine state machines and wherein the decoder stage is further operable
to receive context indices from the plurality of nine state machines; and
to receive the respective context from the memory in response to the respective context index; and
a second integrated circuit coupled to the first integrated circuit.

38. The system of claim 37 wherein the first and second integrated circuits are disposed on a same die.

39. The system of claim 37 wherein the first and second integrated circuits are disposed on respective dies.

40. The system of claim 37 wherein the first integrated circuit comprises a controller.

41. The system of claim 37 wherein the first integrated circuit comprises a video accelerator.

42. The system of claim 37 wherein the first integrated circuit comprises a video decoder.

43. The system of claim 37 wherein the first integrated circuit comprises a video encoder-decoder.

44. The system of claim 37 wherein the second integrated circuit comprises a controller.

45. The system of claim 37 wherein the second integrated circuit comprises a memory.

46. The system of claim 37, further comprising:
wherein the received coded data comprises video data; and
a display coupled to the first integrated circuit.

47. A method, comprising:
receiving coded data;
receiving a context index from a state machine, the state machine being one of a plurality of at least nine state machines;
receiving, in response to the context index, a context according to which the received data is coded;
decoding the received coded data according to the context; and
further decoding the coded data with a respective state machine of the plurality of at least nine state machines associated with the corresponding context.

48. The method of claim 47 wherein decoding the received coded data comprises decoding the received data according to a binary arithmetic decoding technique.

49. The method of claim 47 wherein the state machine comprises a finite state machine.

50. The method of claim 47 wherein receiving the coded data comprises receiving coded image data.

51. The method of claim 47, further comprising:
receiving decoding parameters; and
wherein decoding the received coded data comprises decoding the received coded data according to the decoding parameters.

52. The method of claim 47, further comprising updating the context in response to decoding the received coded data.

53. The method of claim 47, further comprising:
wherein the received coded data represents a first region of an image;
generating with the state machine a second context index that is related to a second region of the image; and
wherein receiving the context comprises receiving the context in response to the second context index.

54. The method of claim 47, further comprising storing the further decoded data from the state machine in a first in first out buffer.

55. The method of claim 47 wherein:
the received coded data has data types;
receiving the context comprises receiving contexts according to which the received data types are respectively coded; and
decoding the received coded data comprises further decoding each data type according to a respective one of the contexts.

56. The method of claim 55 wherein each of the plurality of at least nine state machines comprises a respective finite state machine.

57. The method of claim 55 wherein each of the data types comprises a respective syntax element.

58. The method of claim 55 wherein further decoding the coded data with a respective state machine comprises further decoding each of the decoded data types sequentially and in an order in which the data types are received.

59. The method of claim 55 wherein:
receiving the coded data comprises receiving a header; and
further decoding the coded data with a respective state machine comprises further decoding each of the decoded data types sequentially and in an order in which the data types appear in the header.

60. The method of claim 55 wherein further decoding the coded data with a respective state machine comprises further decoding each of the decoded data types sequentially and in an order specified by a video standard.

61. A non-transitory computer readable medium storing instructions that when executed by a controller cause:

the controller to receive coded data;

the controller to receive a context index from a state machine, the state machine being one of a plurality of at least nine state machines;

the controller to receive, in response to the context index, a context according to which the received data is coded;

the controller to decode the received coded data according to the context; and the plurality of at least nine state machines to decode the decoded data further, each state machine decoding the decoded data further for a respective context.

\* \* \* \* \*

UNITED STATES PATENT AND TRADEMARK OFFICE
CERTIFICATE OF CORRECTION

PATENT NO. : 9,001,882 B2
APPLICATION NO. : 13/165015
DATED : April 7, 2015
INVENTOR(S) : Ravin Sachdeva et al.

It is certified that error appears in the above-identified patent and that said Letters Patent is hereby corrected as shown below:

Title Page
Item (30):
"June 21, 2010 (IT)…..VI2010A000175" was omitted from the face of the patent.

Signed and Sealed this
Sixth Day of October, 2015

Michelle K. Lee
*Director of the United States Patent and Trademark Office*